United States Patent [19]

Gillett

[11] Patent Number: 5,379,601
[45] Date of Patent: Jan. 10, 1995

[54] TEMPERATURE ACTUATED SWITCH FOR CRYO-COOLERS

[75] Inventor: John B. Gillett, Woodstock, N.Y.

[73] Assignee: International Business Machines Corporation, Armonk, N.Y.

[21] Appl. No.: 122,262

[22] Filed: Sep. 15, 1993

[51] Int. Cl.⁶ ............................................. F25B 19/00
[52] U.S. Cl. ................................... 62/51.1; 62/298; 62/383; 165/32; 165/96
[58] Field of Search ........................ 62/51.1, 383, 298; 165/32, 96

[56] References Cited

U.S. PATENT DOCUMENTS

| | | | |
|---|---|---|---|
| 3,177,933 | 4/1965 | Webb | 62/383 |
| 3,225,820 | 12/1965 | Riordan | 62/383 |
| 3,391,728 | 7/1968 | Kelly | 165/32 |
| 3,430,455 | 3/1969 | Stuart et al. | 62/383 |
| 3,450,196 | 6/1969 | Bauer | 165/32 |
| 3,525,229 | 8/1970 | Denhoy | 62/55.5 |
| 3,702,533 | 11/1972 | Dirne et al. | 165/96 X |
| 3,807,188 | 4/1974 | Lagodmos | 62/51.1 |
| 4,689,970 | 9/1987 | Ohguma et al. | 62/383 X |
| 4,770,004 | 9/1988 | Lagodmos | 62/383 |

Primary Examiner—Christopher Kilner
Attorney, Agent, or Firm—Lynn L. Augspurger

[57] ABSTRACT

A thermally actuated switch is useful for a redundant cryo-cooled system such as a computer system. In the path between two redundant cryo-heads, a thermally actuated switch which has two sensible parallel thermally conducting plates which are separated by an compressible gas (air) gap which provides a non-conducting fluid and a conducting fluid (mercury). Under operating conditions (below mercury freezing point), the gap is filled with solid mercury, providing an excellent thermal path. If a cooler fails, the temperature on its side of the thermal interface rises until the mercury liquifies. When liquid mercury is displaced from the gap by a non-conducting gas, a thermal open circuit is provided avoiding loss of heat from the alternative cryo-cooler.

12 Claims, 2 Drawing Sheets

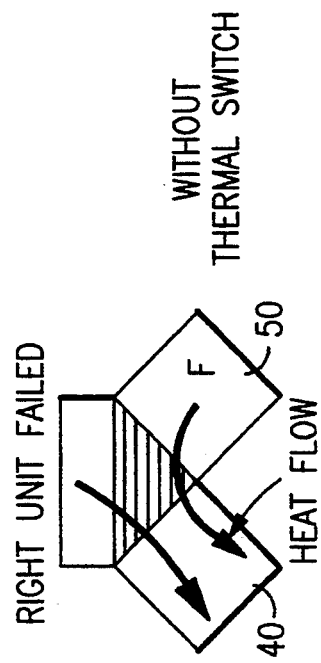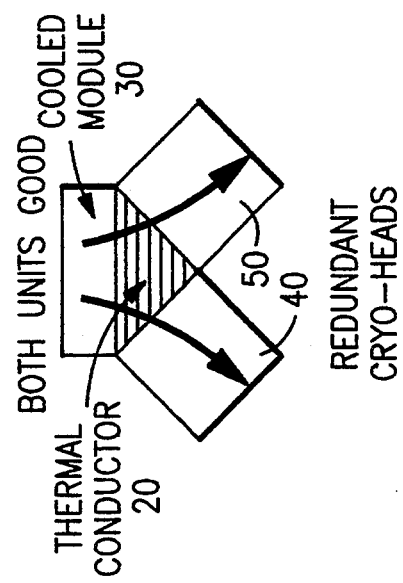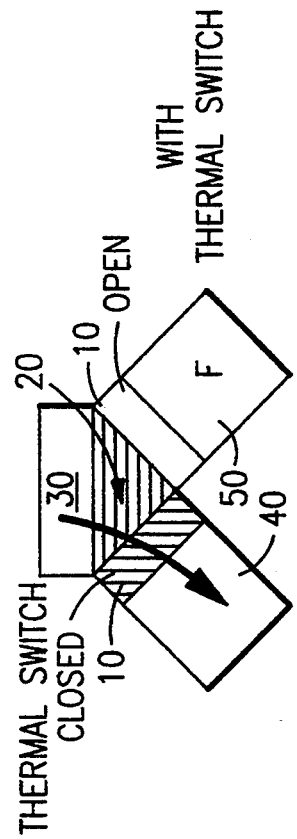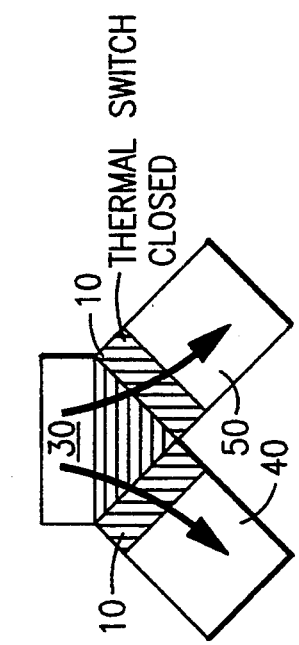

TEMPERATURE ACTUATED SWITCH FOR CRYO-COOLERS

FIELD OF THE INVENTION

This invention is related to temperature sensitive switches, and particularly to electrical or thermal conduction switches capable of high current or thermal flux densities for use in cryo-coolers.

BACKGROUND OF THE INVENTION

There are many applications in which an increase in temperature indicates an abnormal condition requiring action. One example is when a current carrying conductor overheats due to excessive current, and the circuit must be broken in order to provide protection. Several techniques exist to overcome this situation, to which the present invention is an alternative.

Another example exists in the application of refrigeration to electronic equipment to provide improved performance. Since the reliability of refrigeration devices or cryo-coolers is inadequate to meet the stringent demands of electronic equipment availability, redundancy must be used wherein the failure of one cryo-cooler does not affect the thermal performance of the system. Typical redundancy for cryo-coolers requires using two coolers, each alone capable of satisfying the system thermal load, in intimate thermal contact with the load. If one cryo-cooler fails, the other must satisfy the load alone.

A problem that arises is that the failed cryo-cooler, in intimate thermal contact with the load, provides a thermal path draining the capacity of the functioning cryo-cooler, so dramatically affecting efficiency. In order to avoid this, a thermal switch is required between each cryo-cooler and the load. The switch must be an excellent thermal conductor when its associated cooler is operating correctly, but must become a thermal insulator when its associated cooler fails.

The object of the invention is to provide this switch capability, for which there are no known simple techniques currently available.

SUMMARY OF THE INVENTION

In accordance with my invention, a thermally actuated switch comprises two sensibly parallel conducting plates separated by a gap which contains a non-conducting fluid such as air in a first state. Also between the plates I provide a conducting fluid which can phase change from a second state to a third state during normal operations of the application of the thermal switch. In my preferred embodiment, the conducting fluid is mercury.

The conducting fluid (mercury) becomes a conducting solid when its temperature falls below a critical value, and returns to a conducting fluid when its temperature rises above a similar critical value. In addition, the thermally actuated switch can replace the non-conducting fluid with the conducting fluid.

In accordance with my invention the conducting fluid in both a liquid state and solid state is not only thermally conductive, but also electrically conductive metal.

My thermal switch includes a flexible membrane which contains the conducting fluid when the switch is in said first state. The membrane is compressed to force the conducting fluid into the air gap, replacing said non-conducting fluid to produce the second fluid state of the conductor. Mercury, my preferred conducting fluid, becomes solid at a critical temperature, in which release of compression of said membrane produces no movement of said conducting solid.

In accordance with my preferred embodiment the non-conducting fluid is a compressible gas, preferably air, whose pressure provides said way to permit the gas to replace the conducting fluid on changing phase from solid to liquid as a result of a temperature increase above the critical temperature, when said membrane is not in a compressed state.

The switch uses gravity to cause the non-conducting fluid to replace the conducting fluid on changing phase from solid to liquid as a result of a temperature increase above the critical temperature, when said membrane is not in a compressed state.

These and other features of my invention will be understood by those skilled in the art upon reading the detailed description which follows with reference to the drawings illustrating my preferred embodiment.

BRIEF DESCRIPTION OF THE DRAWINGS

FIG. 1 illustrates operation of the thermal switch for redundant cryo-coolers of a computer system in four parts.

The first part, FIG. 1a, shows two redundant cryo-heads with both units good and operating correctly, The second part, FIG. 1b, shows a right failed unit.

FIGS. 1a and 1b illustrate the environment to which the invention applies without the inventive contribution to the art illustrated in the in FIGS. 1c and 1d and in FIG. 2.

The third and fourth parts, FIGS. 1c and 1d show the effect of including a thermal switch in accordance with our preferred embodiment between each cryo-head and a shared thermal conductor.

FIG. 2 shows cross-sections of my thermal switch in three states.

DETAILED DESCRIPTION OF PREFERRED EMBODIMENT

Turning now to my invention in greater detail, FIG. 1 shows schematically the effects of a thermal switch 10 in a redundant cryo-cooled system.

Figure 2C:
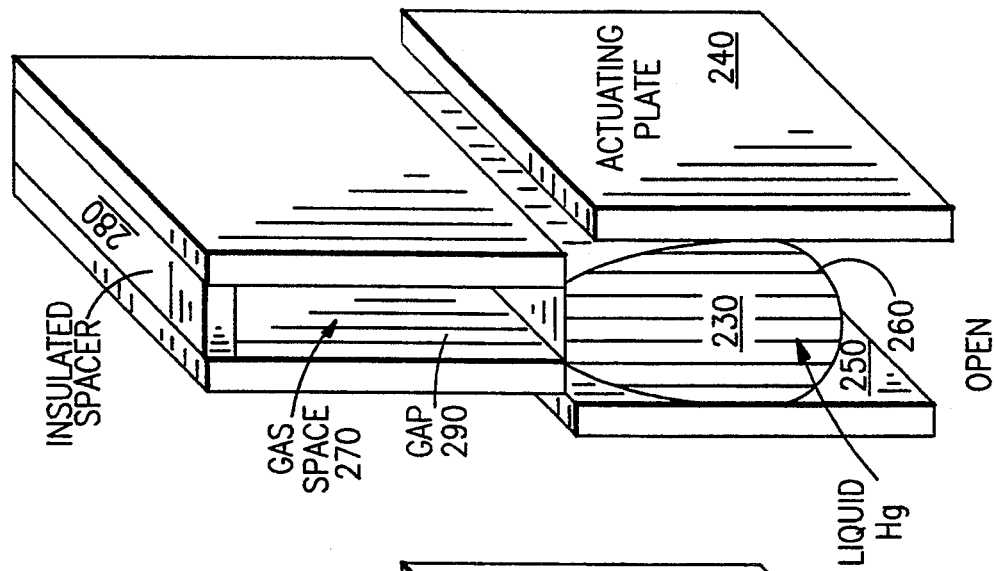
FIG. 2c shows the switch open.
Figure 2B:
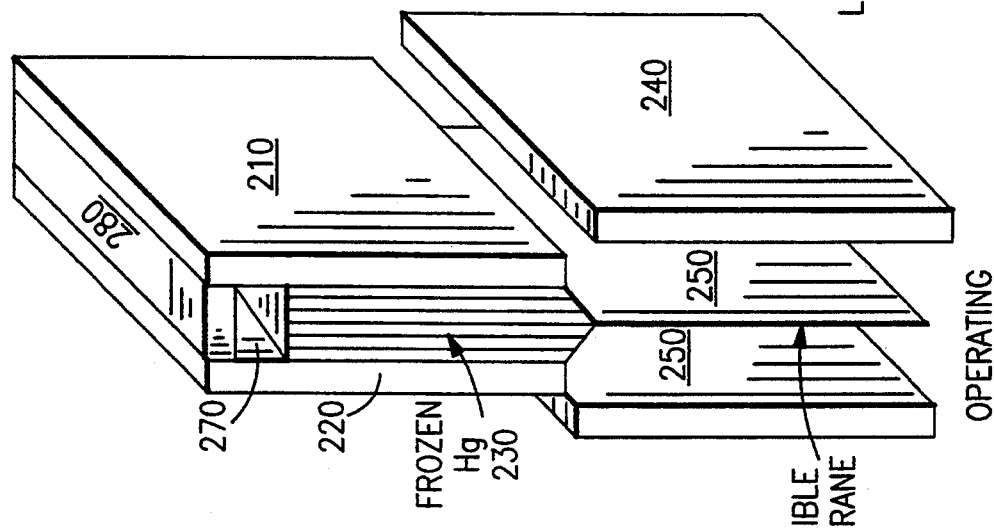
FIG. 2b shows the switch operating.
Figure 2A:
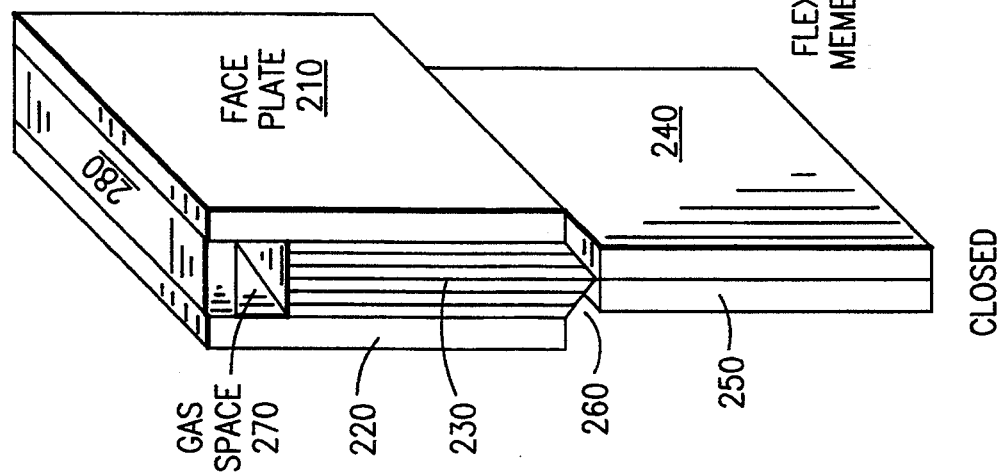
FIG. 2a shows the switch closed.

In accordance with my invention, I provide a thermally actuated switch 10 which, as illustrated in detail in FIG. 2, comprises two sensible parallel temperature conducting actuating plates 240, 250 separated by an air gap 290 which provides a non-conducting fluid, the air in my preferred embodiment. In accordance with my invention, I have provided between the plates a thermal and electrical insulating material in the form of a non-conducting fluid. In normal operating temperature of the application, the cryo-cooler of a computer system, the second thermally conducting fluid readily conducts heat in a second state, and in a third state when it is solid.

As a second conducting fluid, I prefer to use mercury (Hg). This second conducting fluid is a metal whose phase changes from liquid to solid and back at a temperature appropriate to the application. Liquid mercury freezes at −38 degrees Celsius, and is used to illustrate the principles of the invention.

The interface between each cryo-cooler and the load is typically a large surface area with a separable thermal contact. In this interface I place in the path between two redundant cryo-heads, a thermal switch which has two parallel metal plates separated by a gap. Under operating conditions (below mercury freezing point), the gap is filled with solid mercury, providing an excellent thermal path. If a cooler fails, the temperature on its side of the thermal interface rises until the mercury liquifies. When liquid, the mercury is displaced from the gap by a non-conducting gas, thus providing a thermal open circuit and avoiding loss of heat from the alternative cryo-cooler.

FIG. 1a shows two redundant cryo-heads 40 and 50 connected to a module 30 to be cooled via a shared thermal conductor 20. Both cryo-heads are illustrated as operating correctly, such that the heat flow from the module is shared evenly. In FIG. 1b, cryo-head 50 is shown as failed, such that cryo-head 40 absorbs all of the heat from the load in addition to the heat load now associated with cryo-head 50.

FIGS. 1c and 1d show the effect of including a thermal switch 10 between each cryo-head and the shared thermal conductor 20. When both cryo-heads are operational, FIG. 1c, the thermal load is shared as in FIG. 1a, but when cryo-head 50 fails, as in FIG. 1d, its associated thermal switch 10 opens and prevents loss of thermal energy to cryo-head 40.

FIG. 2 shows cross-sections of the thermal switch 10 in three states. The insulates spacer 280 encloses the gap 290 between the face plates 210, 220 on the three edges of the face plates not enclosed by the membrane 260. The flexible membrane 260 seals the fourth edge with an adjustable volume.

The first, or "Open" state, is seen in FIG. 1c. The temperature of the mercury 230 is above its transition temperature, the actuating plates 240, 250 are separated from each other, and gravity and/or gas pressure in gas space 270 forces the mercury out of the gap 290 into the flexible membrane 260.

FIG. 1a shows the effect of bringing together the actuating plates 240, 250, forcing the liquid mercury 230 into the gap 290 and compressing the gas 270. The switch is now conductive.

FIG. 1b shows the switch after the temperature has dropped below the mercury freezing point. At this time, the actuating plates 240, 250 are again separated, but the mercury is frozen solid in place and does not move, retaining the conductive properties of the switch. If the temperature of the mercury rises above melting point, the liquid mercury flows into the membrane 260 and the switch becomes insulating again, as in FIG. 1c.

FIG. 1 illustrates my preferred embodiment of two cryo-coolers, each capable of satisfying the cooling system cooling demand alone, connected redundantly to a thermal load with two switches having conducting plates which are connected between two thermally conducting surfaces such that a good thermal path exists between said surfaces when said conducting fluid or solid fills said gap, and a poor thermal path exists when said non-conducting fluid fills said gap. The arrangement is useful when a failure of one of said redundant cryo-coolers causes its temperature to rise above a critical temperature such that its associated said thermal switch becomes thermally insulating, preventing substantial loss of cooling capacity of other said redundant cryo-cooler through unwanted conduction to said failed cryo-cooler.

The thermally actuated switch which I have described in detail with respect to FIG. 2 provides the switch for the cooling system. The switch includes the flexible membrane 290 which contains said conducting fluid when switch is in said first state, and the actuating plates provide a way to compress the conducting mercury against the flexible membrane to force the conducting mercury as fluid into said gap, replacing space taken by the compressible gas, the non-conducting fluid. At a temperature below a critical temperature, the conducting fluid becomes solid, and at that point release of compression of the conducting fluid against the membrane produces no movement of said conducting solid.

There are two ways to cause the gas to replace the conducting fluid on changing phase from solid to liquid as a result of a temperature increase above said critical temperature, when said membrane is not in a compressed state. Gravity causes the non-conducting gaseous fluid to replace the conducting fluid on changing phase from solid to liquid as a result of a temperature increase above said critical temperature, when said conducting fluid against said membrane is not in a compressed state. In an alternative embodiment, the pressure of the compressed gas causes the non-conducting gaseous fluid to replace the conducting fluid on changing phase from solid to liquid as a result of a temperature increase above said critical temperature, when said conducting fluid against said membrane is not in a compressed state.

It will be seen that the conducting plates are connected between two thermally conducting surfaces such that a good thermal path exists between said surfaces when said conducting fluid or solid fills said gap, and a poor thermal path exists when said non-conducting fluid fills said gap. These conducting plates are connected between two electrically conducting surfaces such that a good electrical path exists between said surfaces when said conducting fluid or solid fills said gap, and a poor electrical path exists when said non-conducting fluid fills said gap.

While I have described the preferred embodiment of my invention, it will be understood that those skilled in the art, both now and in the future, may make various improvements and enhancements which fall within the scope of the claims which follow. These claims should be construed to maintain the proper protection for the invention first disclosed.

What is claimed is:

1. A temperature actuated switch comprising two sensibly parallel conducting plates separated by a gap, said gap containing a non-conducting fluid in a first state, a conducting fluid in a second state, said conducting fluid becoming a conducting solid in a third state;

wherein said conducting fluid becomes a conducting solid when its temperature falls below a critical value, and returns to a conducting fluid when its temperature rises above a similar critical value; and wherein said switch includes means to replace said non-conducting fluid in said gap with said conducting fluid, and a flexible membrane which contains said conducting fluid when switch is in said first state, and means to compress said conducting fluid against said membrane to force said conducting fluid into said gap, replacing said non-conducting fluid to produce said second state;

whereby said conducting fluid becomes solid at a temperature below said critical temperature, and in which release of compression of said conducting fluid against said membrane produces no movement of said conducting solid.

2. A switch as in claim 1 wherein said conducting fluid and solid refer to electrically conductive materials.

3. A switch as in claim 1 wherein said conducting fluid and solid refer to thermally conductive materials.

4. A switch as in claim 1 wherein said conducting fluid and solid refer to both thermally and electrically conductive materials.

5. A switch as in claim 1 including means to replace said conducting fluid in said gap with said non-conducting fluid.

6. A switch as in claim 1 in which the conducting fluid is liquid mercury.

7. A switch as in claim 1 in which the non-conducting fluid is a compressible gas.

8. A switch as in claim 1 wherein said non-conducting fluid is a compressible gas whose pressure causes said gas to replace said conducting fluid on changing phase from solid to liquid as a result of a temperature increase above said critical temperature, when said conducting fluid against said membrane is not in a compressed state.

9. A switch as in claim 1 wherein gravity causes said non-conducting fluid to replace said conducting fluid on changing phase from solid to liquid as a result of a temperature increase above said critical temperature, when said conducting fluid against said membrane is not in a compressed state.

10. A switch as in claim 1 wherein said conducting plates are connected between two thermally conducting surfaces such that a good thermal path exists between said surfaces when said conducting fluid or solid fills said gap, and a poor thermal path exists when said non-conducting fluid fills said gap.

11. A switch as in claim 1 wherein said conducting plates are connected between two electrically conducting surfaces such that a good electrical path exists between said surfaces when said conducting fluid or solid fills said gap, and a poor electrical path exists when said non-conducting fluid fills said gap.

12. A cooling system comprising two cryo-coolers, each capable of satisfying the cooling system cooling demand alone, connected redundantly to a thermal load with a thermal switch for each cryo-cooler having conducting plates which are connected between two thermally conducting surfaces such that a good thermal path exists between said surfaces when said conducting fluid or solid fills said gap, and a poor thermal path exists when said non-conducting fluid fills said gap, wherein a said thermal switch includes means to replace said non-conducting fluid in said gap with said conducting fluid, and a flexible membrane which contains said conducting fluid when switch is in said first state, and means to compress said conducting fluid against said membrane to force said conducting fluid into said gap, replacing said non-conducting fluid to produce said second state in response to a positive feedback signal causing said thermal switch to act as an on-/off switch;

whereby said conducting fluid becomes solid at a temperature below said critical temperature to maintain an on switched condition an the event in which release of compression of said conducting fluid against said membrane produces no movement of said conducting solid, and wherein the failure of one of said redundant cryo-coolers causes its temperature to rise above a critical temperature such that its associated said thermal switch becomes thermally insulating, preventing substantial loss of cooling capacity of other said redundant cryo-cooler through unwanted conduction to said failed cryo-cooler.

* * * * *